(12) United States Patent
Adams

(10) Patent No.: US 6,680,456 B2
(45) Date of Patent: Jan. 20, 2004

(54) ION FUSION FORMATION

(75) Inventor: Robbie Adams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 270 days.

(21) Appl. No.: 09/877,185

(22) Filed: Jun. 9, 2001

(65) Prior Publication Data

US 2002/0185476 A1 Dec. 12, 2002

(51) Int. Cl.⁷ .............................................. B23K 10/00
(52) U.S. Cl. ........................ 219/121.47; 219/121.48; 219/76.16; 427/446
(58) Field of Search ...................... 219/121.47, 121.48, 219/121.5, 121.52, 121.54, 121.57, 121.38, 121.37, 76.16, 137.43; 427/446, 450, 452; 29/DIG. 39; 118/723 DC (56) References Cited

U.S. PATENT DOCUMENTS

| | | | |
|---|---|---|---|
| 3,133,874 A | 5/1964 | Morris | 204/298 |
| 4,300,474 A | 11/1981 | Livsey | 118/641 |
| 4,323,756 A | 4/1982 | Brown et al. | 219/121 LF |
| 4,411,733 A | 10/1983 | Macklin et al. | 156/643 |
| 4,575,612 A * | 3/1986 | Prunier | 219/137.43 |
| 4,752,352 A | 6/1988 | Feygin | 156/630 |
| 4,758,304 A | 7/1988 | McNeil et al. | 156/626 |
| 4,927,992 A | 5/1990 | Whitlow et al. | 219/121.65 |
| 5,017,317 A | 5/1991 | Marcus | 264/81 |
| 5,098,483 A | 3/1992 | Little et al. | 148/4 |
| 5,104,684 A | 4/1992 | Tao et al. | 427/38 |
| 5,135,695 A | 8/1992 | Marcus | 264/141 |
| 5,156,697 A | 10/1992 | Bourell et al. | 156/62.2 |
| 5,182,170 A | 1/1993 | Marcus et al. | 428/551 |
| 5,302,237 A | 4/1994 | Larson et al. | 156/643 |
| 5,376,767 A * | 12/1994 | Heanley et al. | 219/121.36 |
| 5,403,399 A * | 4/1995 | Kurihara et al. | 118/723 DC |
| 5,442,153 A * | 8/1995 | Marantz et al. | 219/121.47 |
| 5,472,566 A | 12/1995 | Swann et al. | 156/643.1 |
| 5,552,675 A | 9/1996 | Lemelson | 315/111.21 |
| 5,575,932 A | 11/1996 | Goff | 219/121.84 |
| 5,584,663 A * | 12/1996 | Schell et al. | 416/241 R |
| 5,587,093 A | 12/1996 | Aston | 219/121.48 |
| 5,741,404 A | 4/1998 | Cathey | 204/192.11 |
| 5,837,960 A | 11/1998 | Lewis et al. | 219/121.63 |
| 5,977,549 A | 11/1999 | Wang et al. | 250/423 R |
| 5,989,779 A | 11/1999 | Hatakeyama et al. | 430/296 |
| 6,046,426 A | 4/2000 | Jeantette et al. | 219/121.63 |
| 6,203,861 B1 | 3/2001 | Kar et al. | 427/554 |

OTHER PUBLICATIONS

Fessler et al., "Laser Deposition of Metals for Shape Deposition Manufacturing," Stanford University et al., 8 pp.
Beardsley, "Making Light Work," *Scientific American*, Aug. 1997, 1 p.

(List continued on next page.)

*Primary Examiner*—Quang T. Van
(74) *Attorney, Agent, or Firm*—Robert Desmond, Esq.

(57) ABSTRACT

An ion fusion formation (IFF) system uses a plasma welding torch to create ions that heat feedstock for application at a deposition point. A plasma welding torch may use argon gas or the like in order to provide extremely hot ions that impact or collide with the feedstock in order to melt it and enabling application of the melted feedstock to a deposition point on a workpiece. By positioning the workpiece, wire feeder, and/or welding torch, parts, devices, or components can be built in almost any three-dimensional shape. Parts can be manufactured in a "just-in-time fashion" with high precision and predictable performance.

13 Claims, 5 Drawing Sheets

OTHER PUBLICATIONS

"Selective Laser Sintering," Laboratory for Freeform Fabrication, University of Texas at Austin, from web site http://lff.me.utexas.edu/sls.html, 2 pp.

Birmingham et al., "Development of a Selective Laser Reaction Sintering Workstation," Center for Materials Science and Engineering, University of Texas at Austin, pp. 147–153.

"A Process With Material Advantages," DTM Corporation, 1996, 4 pp.

Zong et al., "Direct Solid Freeform Fabrication of High Temperature Materials Using Selective Laser Sintering," *Processing And Fabrication Of Advanced Materials For High Temperature Applications II*, The Minerals, Metals & Materials Society, 1993, pp. 503–518.

"Laser Sintering" bibliography listing, compiled by Chuck Drew, NERAC, Tolland, Connecticut, 12 pp.

Jeantette et al., "Method and System for Producing Complex–Shape Objects," IBM web site excerpts of U.S. Pat. No. 6,046,426, 6 pp.

deAngelis, "Method of Three–Dimensional Rapid Prototyping Through Controlled Layerwise Deposition/Extraction and Apparatus Therefor," IBM web site excerpts of U.S. Pat. No. 5,398,193, 3 pp.

Marcus et al., "Method of Producing Parts By Selective Beam Interaction of Powder With Gas Phase Reactant," IBM web site excerpts of U.S. Pat. No. 5,182,170, 4 pp.

Whitlow et al., "Energy Beam Casting of Metal Articles," IBM web site excerpts of U.S. Pat. No. 4,927,992, 3 pp.

Dickens et al., "Rapid Prototyping Using 3–D Welding," Department of Manufacturing Engineering and Operations Management, University of Nottingham, UK, pp. 280–290.

Definitions of "Shape Melting"and Three–Dimensional Printing, from web site http://mtiac.hq.iitri.com/MTIAC/pubs/rp/rp49.htm, 2 pp.

Marcus et al., "Solid Freeform Fabrication Proceedings," SFF Symposium, University of Texas at Austin 1992, 6 pp.

Wozny, "Systems Issues in Solid Freeform Fabrication," Rensselaer Polytechnic Institute, New York, pp. 1–15.

Agarwala et al., "FDC, Rapid Fabrication of Structural Components," *The American Ceramic Society Bulletin*, vol. 75, No. 11, 1996, pp. 58–65.

Kochan, "Rapid Developments in Rapid Prototyping," [source publication unknown], 2 pp.

Michaels et al., "Metal Parts Generation By Three Dimensional Printing," Massachusetts Institute of Technology, pp. 244–250.

Beck et al., "Manufacturing Mechatronics Using Thermal Spray Shape Deposition," Engineering Design Research Center, Carnegie Mellon University, pp. 272–279.

Hartmann et al., "Robot–Assisted Shape Deposition Manufacturing," The Robotics Institute and The Engineering Design Research Center, Carnegie Mellon University, 11 pp.

Alta Vista web search result listings for "free form fabrication software," 6 pp.

Alta Vista web search result listings for "solid+ free+ form+ fabrication software," 2 pp.

Listing of "Commerical Vendors," Rapid Prototyping Directory, from web site http://mtiac.hq.iitri.com/mtiac/pubs/rp/rp6.htm, 11 pp.

"Applications" of rapid prototyping web article, from web site http://mtiac.hq.iitri.com/MTIAC/pubs_/rp/rp5.htm, 2 pp.

Kietzman et al., "Layered Manufacturing Material Issues for SDM of Polymers and Ceramics," Proceedings of the 1997 Solid Freeform Fabrication Symposium, The University of Texas at Austin, 9 pp.

* cited by examiner

ION FUSION FORMATION

TECHNICAL FIELD

This invention relates to the fabrication of parts and devices and more particularly to a part-making assembly that uses energetic ions to melt feedstock and selectively apply it to the workpiece.

BACKGROUND ART

The manufacture of parts, prototypes, and the like is an important component to industrial processes, because the manufacture of parts leads to the manufacture of machines which can make useful devices on commercial and industrial levels. Additionally, specialized machines such as jet engines and the like require special parts that must generally be manufactured by hand to a high degree of precision. Consequently, the manufacture of parts and tools are an important part of commercial and industrial activity.

One means by which parts can be made is to take a block of material and cut away the unnecessary portions to leave the part in question. Lathes and the like act in this manner and may use aluminum, steel, or wood as materials from which parts can be made. Saws, routers and the like serve in much the same way.

Recently, it has become possible to manufacture parts from scratch as by stereolithography or laser sintering. In some embodiments, stereolithography uses optical or other focused radiation in order to bind or transform a liquid into a solid in a manner that is consistent with a desired piece or portion in a planar manner. The surface of the liquid melt is bombarded with focused radiation, which causes a solid to form. The radiation is altered or redirected according to the cross-section necessary, relevant, and as associated with a prior cross-section fabrication. In this manner, thin cross-section pieces are constructed in a coordinated manner to ultimately achieve the final workpiece or part. The stereolithographed part can then be used to make a mold from which actual parts can be cast from preferred materials (such as steel, aluminum, or the like). Laser sintering uses a powder subject to the energetic bombardment of laser energy. In much the same way as stereolithography, certain pieces or parts of a structure can be formed in an on-going manner. By careful application and addition of the laser-sintering process, parts can be formed.

Chemical vapor deposition also provides a means by which thin layers can be applied to a workpiece in order to build it up. Chemical vapor deposition, or CVD, is often used in the fabrication of monolithic micro-circuitry.

Additional devices and apparatus exist that apply material to a workpiece in a gradual fashion in order to form the ultimate part or device. While these devices are generally acceptable, each has drawbacks according to the particular technologies used to achieve the fabricating systems. For example, stereolithography can be very expensive and is not necessarily the most effective way to make a part as an actual workpiece is not formed as material such as steel, aluminum or the like are not amenable to stereolithographic processes. Instead, a special melt substance must be used in order to form the workpiece positive from which the mold-negative can be formed. With respect to laser sintering and the like, powder is used that can become an obstacle in the easy fabrication of parts and the like. With CVD, the deposition process generally takes place in a low pressure or vacuum atmosphere. This requires additional equipment in order to provide such a low density atmosphere, increasing costs and maintenance requirements.

Certain patents have issued, including the following: U.S. Pat. No. 4,323,756 issued to Brown et al. on Apr. 6, 1982 for a Method for Fabricating Articles by Sequential Layer Deposition; U.S. Pat. No. 4,411,733 issued to Macklin et al. on Oct. 25, 1983 for a SPER Device for Material Working; U.S. Pat. No. 5,837,960 issued to Lewis et al. on Nov. 17, 1998 for Laser Production of Articles from Powders; and U.S. Pat. No. 6,046,426 issued to Jeantette et al. on Apr. 4, 2000 for a Method and System for Producing Complex-Shape Objects assigned to Sandia Corporation.

The Brown et al. '756 patent describes the fabrication of symmetrical objects by laser or electron beam. This patent does not mention the use of plasma for part construction, and does not address the construction of non-symmetrical devices. The Macklin et al. '733 patent describes a device having an enclosing chamber used to deposit the vaporized-electrode plasma itself, and not a feeded-construction material onto the target. Deposition rates for a Macklin-like device may be low.

In the device shown in the Lewis et al. '960 patent, a laser is used to melt powdered particulate at a deposition point and thereby produce articles. No plasma torch is described, nor is a feed mechanism for a plasma torch. In the Jeantette et al. '426 patent, an object-producing apparatus uses powdered material to effect the manufacturing process. A laser beam fuses the powdered material to the object under construction to obtain near-net- or net-shape objects. No use of a plasma torch is described, nor is use of non-powdered materials. Such laser-reliant systems generally do not provide a large melt pool for faster deposition yet also provide for smaller melt pools for tighter tolerances. Such laser systems generally do not provide a wide range of almost-instantly available power, a wide range of wire speeds, and the ability of the associated positioning device to rotate the workpiece into the horizontal position. Losses also occur at light-transmission junctions such as those present with associated fiber optics.

Many of the features seen in the Jeantette et al. '426 patent and the Lewis et al. '960 patent are also seen in U.S. Pat. No. 6,203,861 issued to Kar et al. on Mar. 20, 2001 for One-Step Rapid manufacturing of Metal and Composite Parts. However, the Kar et al. '861 patent describes the use of multiple beams for multiple processing.

It would be of significant advantage to provide means by which part and pieces could be fabricated in a manner that is advantageous to manufacturers while using readily available and understood technology in a useful and familiar manner.

DISCLOSURE OF INVENTION

Ion Fusion Formation (IFF) is a mechanism that fabricates components without machining, molds, or mandrels. In most conventional component fabrication, a block of material is machined to shape and size, or a mold is used as in castings or material is deposited on a mandrel as in chemical vapor deposition. IFF builds a part by applying small amounts of molten material only where needed to build a part. The components are formed in many small deposition steps resulting in net-shape or near-net-shape parts. Any fusible material, metal, ceramics, plastics, etc. or combinations can be used to build parts with this process.

The key components of the device are a concentrated ion heat source, a material conveyance system, and a positioning system. Additional components required are electrical power and a controller and/or computer with a positioning system. Small amounts of material are placed on top of a base or previous deposition point. The ion heat source can be composed of positive ions, negative ions, combinations thereof, electrons solely, or ions of any sort in combination electrons. The ion heat source must be concentrated to some extent in order to enable building in small increments. Concentration can be accomplished mechanically with orifices of varying sizes or electromagnetically. The smaller the increments of material deposited, the more accurate is the building system. However, for larger components, ion sources with larger cross-sectional areas, and more heat, could be used to deposit larger amounts of material per deposition point. Small and large ion heat sources could be used together to give high deposition rates in some areas of the component and high accuracy in other areas.

Material for deposition can be conveyed to the point of fusion by a feedstock feeder (including powder feeders and wire feeders) or any other feedstock transport mechanism. Preferably, the feeder should be able to vary material transport rate to optimize deposition speed with heat input.

The building scheme for a specific part may typically based on an electronic model (such as a CAD-CAM file), but build instructions could be programmed into the controller manually. While computer control is preferred for most of the more complex components, simple forms, such as tubes and cylinders, could be created without the computer and by only using the positioner controller. A preferred approach, but not the only approach, is to use existing CNC (Computer Numerical Control) programming language to control the positioner. However any control language with software capable of representing 3 dimensional entities such as STL (Stereolithography Language) is acceptable.

A preferred deposition approach for many components, but not the only approach, is layer building. Horizontal slices are taken through the three dimensional electronic model by computer programs. The positioner then deposits material across each layer at a prescribed thickness. The controlling instructions will position the deposition at the appropriate point on the component and will also not deposit material at holes or other voids.

Movement of the hardware to its appropriate location can be accomplished by X-Y-Z, vertical and rotational motion. Alternatively, the ion heat source can be moved in like manner or the part and ion source can be moved simultaneously or alternately.

In summary, ion fusion formation (IFF) can be used to eliminate many steps which currently exist in fabrication processes. By reducing machining and molding steps, products can be brought to market faster, manufacturing or other schedules can be met on time, and components that have been incorrectly processed in non-machine phases can be quickly replaced. In short, IFF may provide the potential to deliver "instant parts", and "just-in-time" manufacturing becomes even more possible than ever before.

Other features and advantages of the present invention will become apparent from the following description of the preferred embodiment(s), taken in conjunction with the accompanying drawings, which illustrate, by way of example, the principles of the invention.

MODE(S) FOR CARRYING OUT THE INVENTION

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
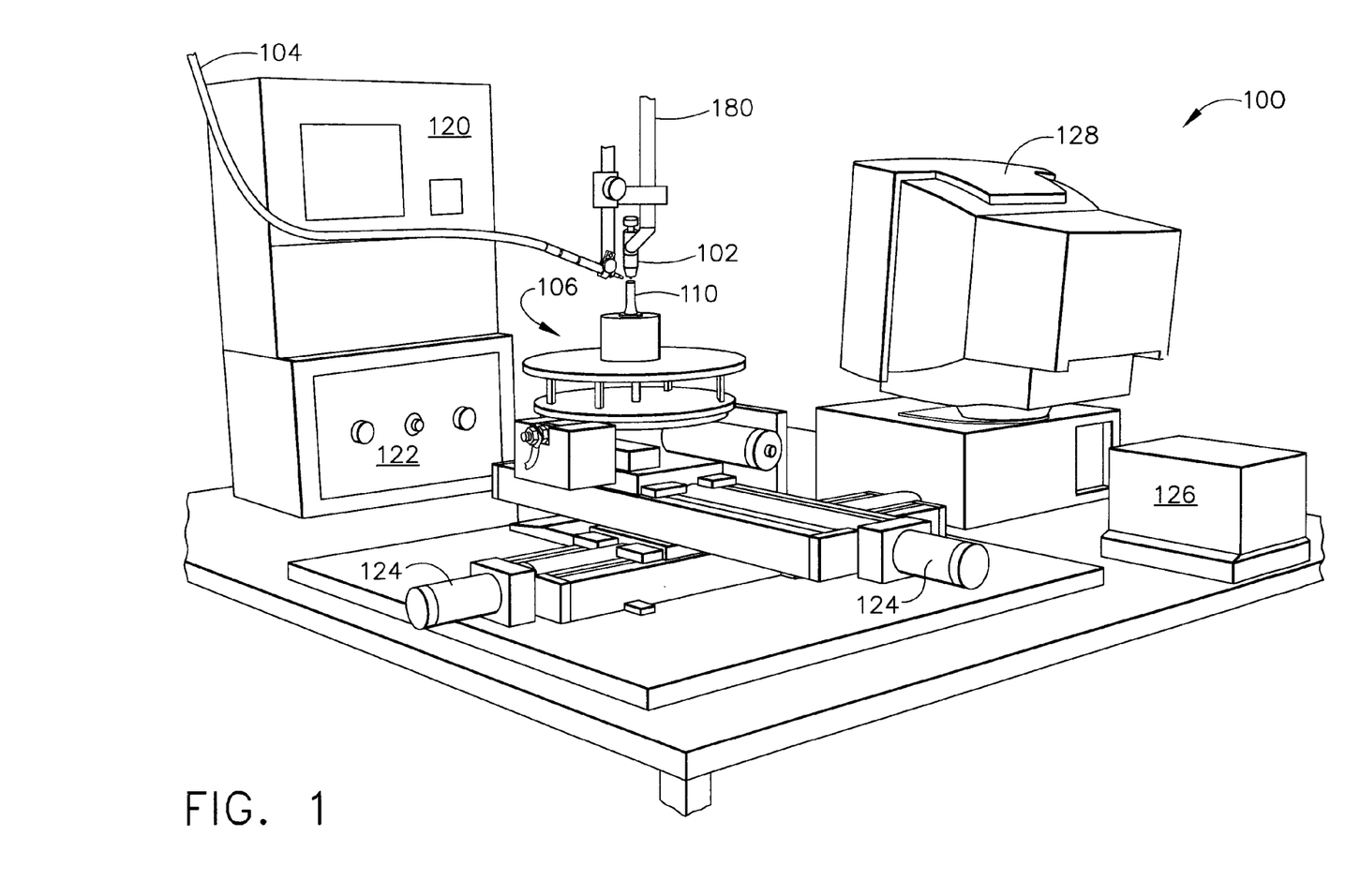
FIG. 1 is a perspective view of an Ion Fusion Formation system according to the present invention.

As shown in the Figures, particularly FIG. 1, the Ion Fusion Formation (IFF) system 100 of the present invention uses a plasma welding torch 102 in conjunction with a wire feed mechanism 104 and a positioning system 106 in order to achieve the present invention. The positioning system 106 generally serves to position the workpiece 110, so that operations can be performed on it as by adding additional material through the wire feed mechanism 104 at the deposition point. However, the positioning system 106 may be extended to coordinatingly control all three participants of the workpiece manufacturing process, namely the workpiece 110, the wire feed mechanism 104, and the plasma welding torch 102. In this way, three-dimensional articles can be fabricated in a predictable, highly-selectable, and useful manner. Control of the positioning system may be achieved by computer-implemented control software or the like.

Figure 2:
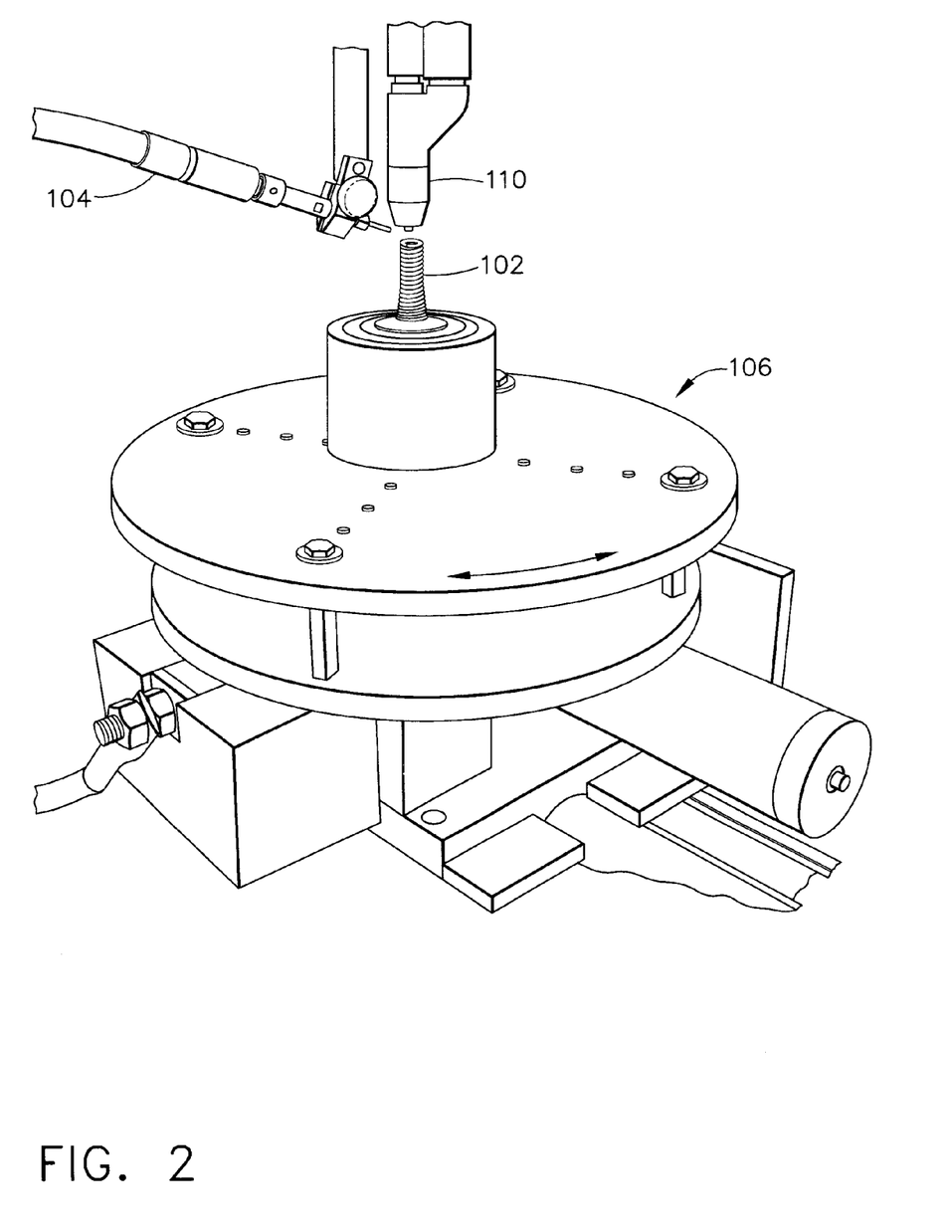
FIG. 2 is a closer view of the operating area for the workpiece construction.

FIG. 2 provides an enlarged view of the operating area of the present invention showing the plasma torch 102, wire feed mechanism 104, and the workpiece 110.

Additional elements shown in FIG. 1 are the gas controller 120, which controls the flow of gas and/or fluids to the plasma torch 102. A plasma or arc power source 122 supplies the necessary power to the plasma torch 102. Positioners and/or positioning motors 124 are supplied with positioning signals from an electric drive 126 that may be coupled to a computer 128 or other controlling device.

In coordinated fashion, the plasma torch 102, wire feed mechanism 104, and positioning system 106 provide a highly-flexible, manually adaptable and spontaneously-constructable, as well as possibly highly automated means by which parts or other articles can be fabricated to net- or near-net-shape.

Figure 3:
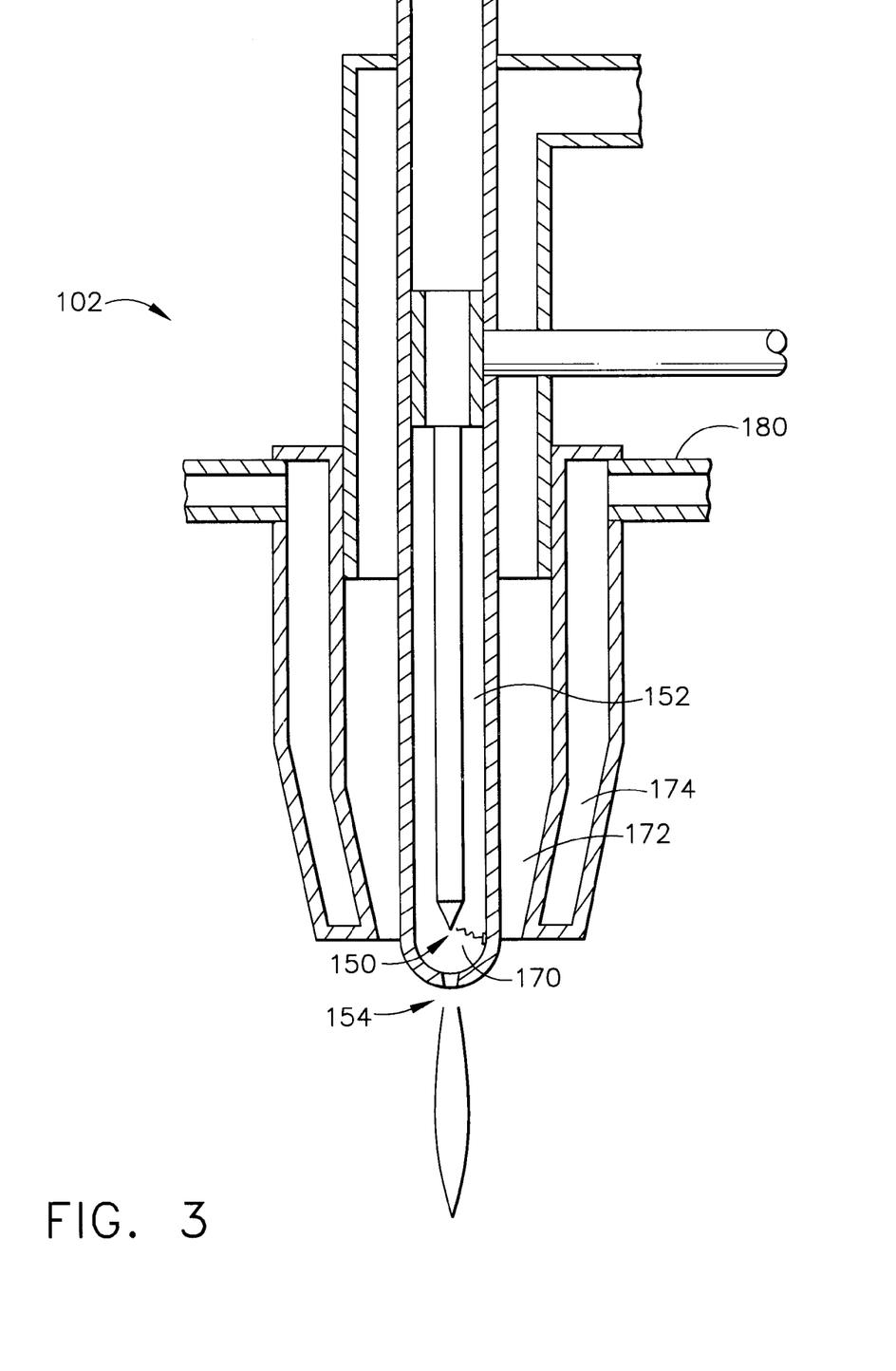
FIG. 3 is a schematic diagram of the plasma torch used in the present invention.

The plasma welding torch 120 is shown in greater detail in FIG. 3. The plasma welding torch 120 has an arc electrode 150 that serves to ionize adjacent gas. In one embodiment, and currently the preferred embodiment, the noble gas argon is used in order to generate ions. Upon energization by the plasma-generating arc 150, the argon gas is rapidly accelerated away from the plasma generator 150. To accelerate and attract the ions, the workpiece 110 may be made part of an electrical circuit including the ionized plasma gas. The workpiece 110 may be charged by the application of voltage in a manner the opposite of the charge generally present in the ionized plasma gas. The ionized gas is then electrically attracted to the workpiece 110. Use of such electrical charge in the workpiece may also serve to control the direction and distribution of the ionized plasma gas. By increasing or decreasing the charge present on the workpiece 110, the attraction (or even repulsion) of the ionized plasma gas flow may be controlled. The pressure or flow of the incoming argon gas 152, as well as the nozzle 154 serve to direct the energetic argon gas out the nozzle and towards the workpiece, including the wire feed mechanism 104.

While the use of the noble gas argon is seen as one possible preferred embodiment of the present invention, other inert gasses, ions, molecules, or atoms can be used in conjunction with a plasma welding torch 102 in place of argon. Such additional mediators of the plasma energy include positive ions, negative ions, combinations of such ions, electrons only, and/or ions of any sort and combinations with electrons. Furthermore, while an inert gas is currently seen as one advantageous embodiment, reactive elements might be introduced in a "doped" argon gas mixture in order to provide better operation for the plasma welding torch 102.

The plasma-generating process so energizes the argon gas that the argon gas achieves temperatures on the order of 5,000K (8540° F.)–30,000K (53,540° F.). Consequently, it does not take a large volume of argon gas in order to melt the feedstock 160 that is present at the wire feed mechanism 104. Of importance is the collimation, or focus, of the argon plasma. Nozzles of varying apertures or other orifices can provide specific geometry useful for the fabrication of certain parts. Direct beam nozzle orifices may contrast with those having a fan shape or otherwise.

One consideration that must be made with respect to the ionized argon plasma is its strong affinity for electrons. All elements in the periodic table seek to establish stable electron shell structures. The most stable electron shell structures are those of the noble gases. Consequently, when a noble gas loses one or more of its electrons, it has a very strong affinity for electrons and will obtain them from the surrounding atmosphere. Such surrounding atmosphere often includes nitrogen and oxygen in ambient environments. Consequently, in order to enhance the operation of the ion fusion information system 100 of the present invention, the ionized argon plasma may be sheathed or protected by a flowing "curtain" of helium, another noble gas. Helium holds its electrons with a high degree of affinity and is less susceptible to having its electrons taken by the ionized argon plasma.

Figure 5:
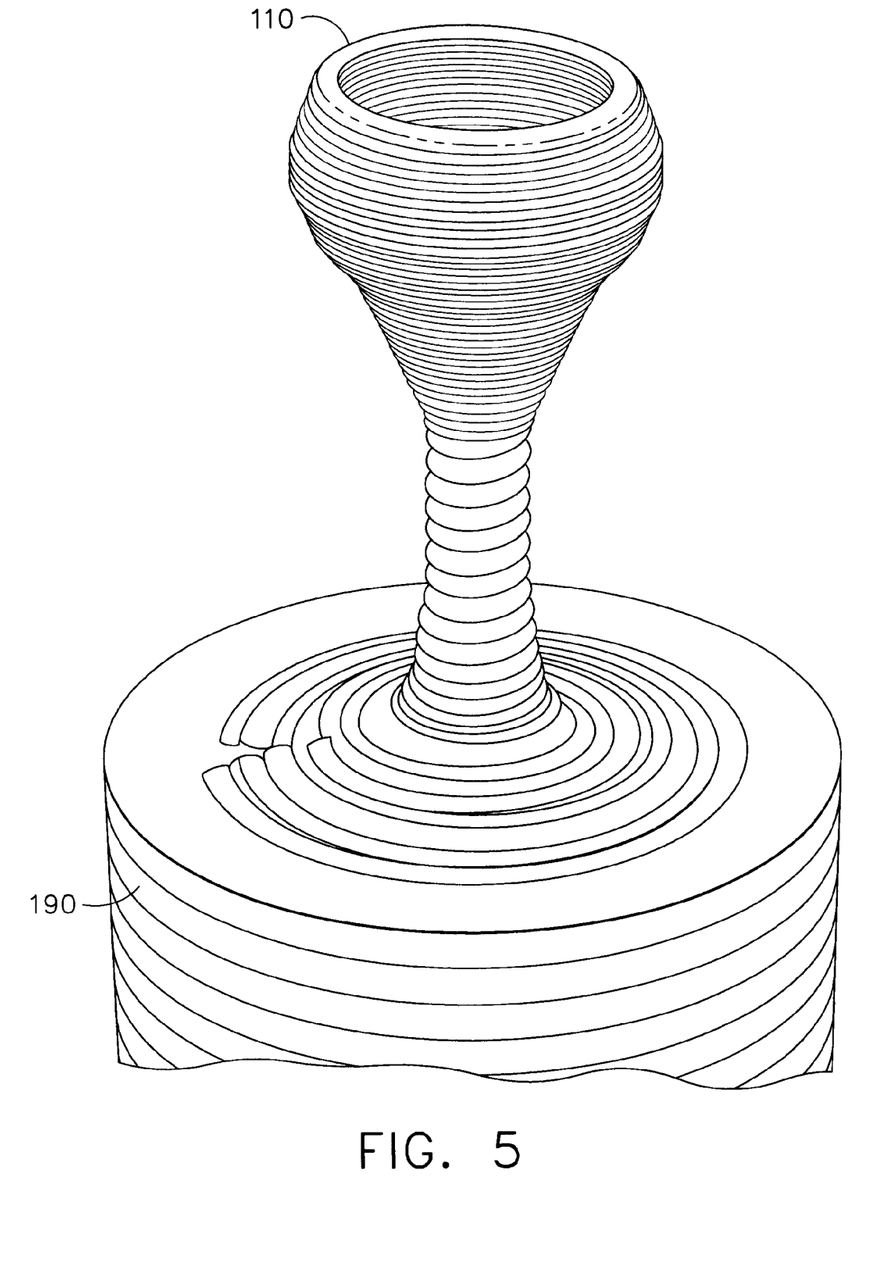
FIG. 5 is an example of an article, in this case a goblet-shaped rocket nozzle, that can be manufactured by the present invention.

In FIG. 3, the argon plasma flow 170 is shown as being circumscribed by helium gas 172. Also shown in FIG. 3 is the flow of cooling water ($H_2O$) 174, which is generally used to cool the nozzle as some of the energetic argon will collide with the internal surfaces of the nozzle 154. Left unchecked, the energetic argon plasma will serve to heat up and ultimately melt the nozzle, destroying the plasma welding torch 102. As shown in FIG. 1, a gas and water flow line 180 is shown leading into the plasma welding torch 102. In operation, tanks of argon generally come in sizes of approximately 1,000 cubic feet and may be used to good effect. Alternatively, industrial projects may require larger volumes that are piped in to the fabrication area. The flow rate demanded by the plasma welding torch 102 is generally on the order of 0.75 liters per minute, although the plasma welding torch has a usable range of 0.2 to approximately 1.3 liters per minute. This volume gives a general indication of the number of argon atoms used per minute with respect to the plasma welding torch 102. The actual argon flow rate is determined by the pressure of the argon gas flow 152, as well as the nozzle-orifice 154. In one embodiment, an orifice of approximately 1.8 millimeters can be used to construct an article such as a goblet-shaped rocket nozzle as shown in FIG. 5.

Figure 4:
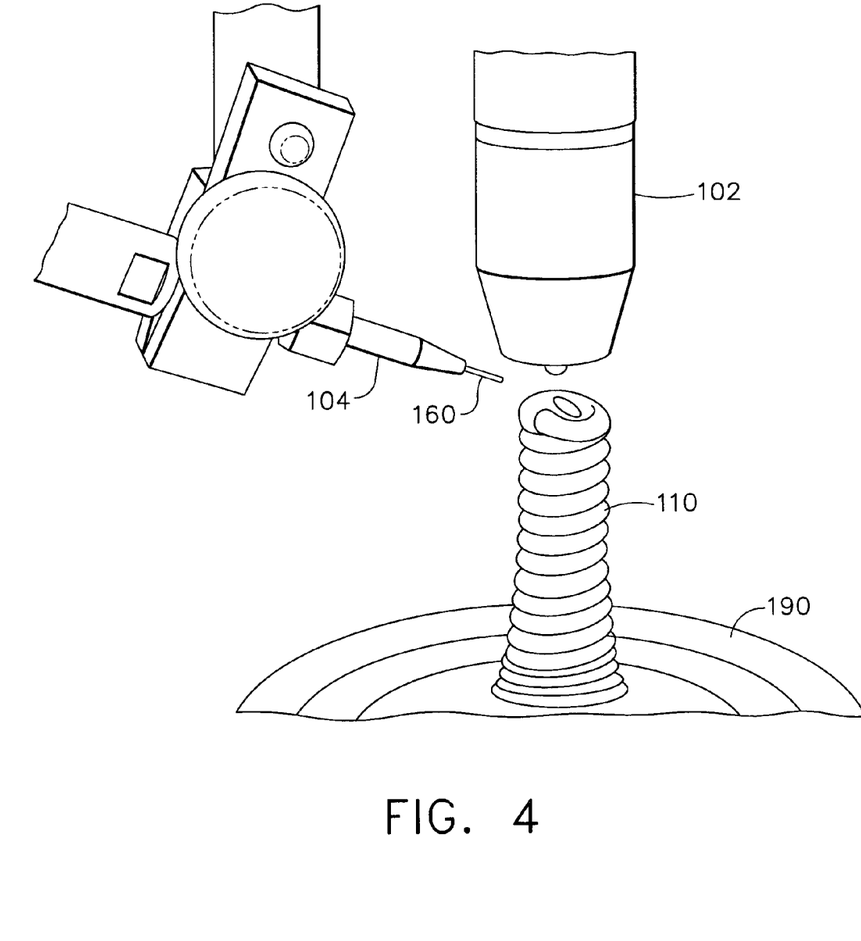
FIG. 4 is a detailed view of the operating area of the plasma torch.

As shown in FIG. 4, the wire feed mechanism 104 feeds wire 160 into the path of the hot argon plasma 170. The deposition point upon the workpiece 110 is then augmented by the addition of melted feedstock 160 according to the program executed by the ion fusion formation system 100 of the present invention either via automatic programming or by hand. Other feedstock feeders, including powder feeders, may be used in the place of the wire feeder 104.

Computer numerical control (CNC) can be used to control positioners for the workpiece 110 and/or the wire feed mechanism 104 and/or the plasma welding torch 102. By providing the largest number of degrees of freedom possible with independent positioning systems for all three participants in the manufacturing process, the broadest range of articles can be manufactured using the present IFF system 100. Feedback mechanisms known in the art or developed in the future can be used in order to independently sense the operation of each of the three elements.

In one embodiment, a computer, such as the computer 128 shown in FIG. 1, or other information-processing machine can be used to record the actions of an operator in the construction of a part, component, or device. The actions of the operator can be recorded by an information processing system and then played back to provide an exact duplicate of the fabricated item any number of times. If a skilled operator employs the present system 100 in order to construct a part, then that skill can be brought to bear on each and every additional part that is constructed according to the playback of the skilled operator's actions. Additionally, such instructions can be transmitted electronically, via computer network (including the Internet) to other similar machines, such that a skilled operator in Arizona can transmit his instructions to the same, or similar, machine in New Jersey for exact replication or dimensional translation according to the machine and/or size of the object to be constructed.

Libraries of parts can then be constructed, and if only certain operations need to be performed, only parts of certain operations can be used in the same manner as macros, or programming instructions, can be constructed piecemeal and/or in block structure to provide basic elements or operating procedures for the Ion Fusion Formation system 100 of the present invention.

Implementation of computer-controlled positioning systems are known in the art and may include computer-control for all available control features of the present invention. This provides the craftsman with the ability to control and/or operate the IFF system 100 while concentrating specifically on the part to be made. In some embodiments, five (5) axes of rotation or otherwise may be used to control the operation of the IFF system 100. Additional axes of control/rotation as well as additional plasma torches may be added according to specific or desired implementations. A second torch may provide for finer addition of detail, improving upon initial fabrication by a main torch. In one embodiment of the present invention, Acromill™ software may be used in conjunction with an Acroloop™ ACR 8000 digital signal processor (DSP or controller) in order to operate the axes of control/rotation/travel. Other software/controller/positioners are available and may work as well.

As shown in FIG. 5, a simple device achieved by turning the table 190 under the workpiece 110 can be achieved by altering the radial displacement of the deposition point. Likewise, if additional degrees of freedom are available for the table 190, plasma welding torch 102, and/or wire feed mechanism 104, articles of increasingly advanced design and sophistication may be manufactured.

In providing means by which articles can be constructed from a beginning deposition point, or "from scratch," net-shape, or near-net-shape parts can be constructed and need a minimal amount of machining, if any, in order to provide an acceptable part within the appropriate tolerances. Furthermore, the IFF system 100 of the present invention can be built at relatively low cost. Compared to other systems using lasers or otherwise, the IFF system 100 may be achieved at a cost of approximately $20,000 to $50,000 (2001 year value dollars). Such systems are generally easy to use and generally do not require exotic or expensive sensing equipment.

Any material susceptible to non-destructive melting by an argon ion or other plasma beam may be used in the wire feed mechanism 104 as feedstock 160. Such materials may include steel, such as AISI 9310 low alloy steel, aluminum A356, titanium 6 A1–4V, 304 stainless steel and INCONEL 718. Certain materials may be more susceptible to the Ion Fusion Formation system 100 and the plasma welding torch 102 of the present invention, particularly with respect to operating characteristics and future performance with respect to the initiation of fatigue, propagation of cracks, the toughness of the material once it has been subject to the plasma welding operation, the resistance to corrosion, the resistance to stress corrosion cracking, and the characteristics occurring in the feedstock material 160 when it has been subject to elevated temperatures.

The present invention, Ion Fusion Formation (IFF), uses high temperature plasma/gas to melt the construction material. The predominate and preferred raw material form is wire that can be fed into a selectably-sized melt pool. However, the present invention has the capability to use powder as a raw material when wire is either not preferred, unavailable, or uneconomic. The IFF deposition pool can be can be quite large for faster deposition, but also made smaller for tighter tolerances. A large molten pool is enabled by the use of wire, wide range of instantly available power, a wide range of wire speed and the ability of the IFF positioning device to rotate and/or displace the workpiece long different axes. IFF deposition can be in the form of a helix but can also build in straight vertical columns or horizontal layers. The electrical power to the plasma torch may be varied but is generally not turned off during deposition. The IFF nozzle may angled slightly from vertical to possibly a horizontal position but is generally not inverted. An inverted position might cause the melt to drip. IFF does not depend on light absorption and this is an advantage as light reflection from the metal or other feedstock or workpiece can damage laser optics. This is not a problem with IFF and the present invention has no power losses related to the generation and transmission of laser light.

Alternative embodiments of the present invention include the use of reactive materials including rhenium, titanium, metal-matrix composites, and/or steel. These metal are strong yet suffer from a propensity to oxidize quickly once heated. Such oxidation occurs well below the melting point for these metals and those metals similar to them. Iron in the form of steel wool is an example of this effect. A simple lit match can set fire to steel wool yet the steel wool does not melt as it burns. Consequently, certain accommodations can be made to incorporate the use of such metals in the fabrication processes enabled by the present invention.

To prevent oxidation of metals with high melting points, an inert gaseous environment can be provided at low cost by surrounding the workpiece with a flexible non-sealed cover (not shown). The cover provides a slightly-pressurized environment which holds in an inert gas. Noble gasses such as helium may be used or other gasses, if appropriate, such as nitrogen. The fusion process and material constraints will determine the characteristics of the necessary inert environment.

Alternatively, special reactive gasses or gas mixtures may be used to "dope" the melted material. By providing a predominately inert environment, the cover may be filled not only with inert gas that does not react, oxidize, or otherwise combine with the worked material, but also may include reactive gasses such as chlorine, fluorine (under special circumstances), or otherwise. If a solid is required for doping, special procedures may be implemented to enable, for example, copper ions to be included in the plasma flow for convective heat transfer and injection and/or deposition into the melted work material or feedstock.

While the nozzle 154 of the present invention may generally be subject to direct current (DC) arcing and/or voltage, certain material may require the use of an alternating current (AC) system and/or one that uses variable polarity (VP). Aluminum is one such material. The IFF system 100 of present invention is contemplated as accommodating VP components and operation with good results. For materials that are non-metallic and/or non-conducting, a non-transferred arc may be used.

Additionally, the nozzle 154 shown in FIG. 3 may have a variety of configurations enabling selection of a variety of tips. Circular, square, fan-shaped and other nozzle tips may be used to control the ejection and travel of ions from the electrode 150. Water flow used for cooling the welding torch 102 may entirely surround the chamber holding the electrode 150. Alternatively, the inlet(s) and outlet(s) for the water passages may be placed or positioned near the top or before the top of the nozzle 154, alone, as that portion of the torch 102 requires the greatest cooling.

Other embodiments may include the use of ceramic, glass, plastic or other workable substances in either stiff forms or as flowable powders. Metals used as feedstock may also be added in powder form.

The present invention provides many advantages over laser-related welding and fabrication devices. As the plasma torch uses gas atoms or molecules to effect heat transfer, the particles transmitting energy are more massive and less subject to scattering than photons, the particles used to transfer energy in lasers. In fact, laser-related devices work best in a vacuum where objects (such as gas molecules/atoms) are generally few. Such vacuums may be hard to attain for best laser operation. Additionally, such scattering reduces the efficiency of lasers. In the present invention, the plasma torch does not require specialized knowledge of its operation, advanced and difficult-to-align optics and optically-related equipment, special handling due to the delicate nature of the equipment, nor does the plasma torch operate in a complicated manner, all in contrast to laser-related devices. Instead, an industrially-robust system is provided that enables operation generally without demanding accommodation for special requirements.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof.

Therefore, it is intended that the invention not be limited to particular embodiments disclosed herein for carrying it out, but that the invention includes all embodiments falling within the scope of the appended claims.

What is claimed is:

1. An ion fusion formation system for depositing feedstock on a work surface to create a part, comprising:
   a plasma torch positioned to emit a plasma stream in a plasma path, the plasma stream creating a melt pool deposition point in the work surface;
   a feedstock feeder operably configured to feed feedstock into the plasma path of the plasma torch, and into the melt pool, the feedstock melting at the deposition point when introduced into the plasma path; and
   a positioning system, the positioning system controlling the deposition point of the feedstock on the work surface, whereby a part is fabricated by transferring the feedstock from the feedstock feeder to the part in a controlled manner by melting the feedstock at the deposition point and allowing it to re-solidify on the work surface or on previously-deposited feedstock material.

2. An ion fusion formation system as set forth in claim 1, wherein the plasma torch further comprises:
   an ionizing electrode ionizing adjacent gas.

3. An ion fusion formation system as set forth in claim 2, wherein the adjacent gas further comprises.

4. An ion fusion formation system as set forth in claim 2, wherein the plasma torch further comprises:
   a nozzle, the nozzle supplying a first noble gas to the ionizing electrode and a second noble gas to protect ionized atoms of the first noble gas so that the ionized atoms of the first noble gas more readily react or collide with the feedstock.

5. An ion fusion formation system as set forth in claim 1, wherein the feedstock feeder further comprises:
   a feedstock sensing system that senses feedstock present at the deposition point.

6. An ion fusion formation system as set forth in claim 1, wherein the feedstock feeder is selected from the group consisting of:
   wire feeders and powder feeders.

7. An ion fusion formation system as set forth in claim 1, wherein the positioning system further comprises:
   the positioning system selectably controlling the part to control the deposition point.

8. An ion fusion formation system as set forth in claim 1, wherein the positioning system further comprises:
   the positioning system selectably controlling the plasma torch, the feedstock feeder, and the part to control the deposition point.

9. An ion fusion formation system as set forth in claim 1, further comprising:
   an information processing system coupled to the positioning system, the information processing system transmitting control signals to the positioning system and controlling operation of the positioning system.

10. An ion fusion formation system as set forth in claim 9, further comprising:
    the information processing system also coupled to the plasma torch and the feedstock feeder, the information processing system controlling the plasma torch, the feedstock feeder, and the positioning system in a coordinated manner in order to fabricate the part.

11. An ion fusion formation system as set forth in claim 9, wherein said information processing system further comprises a computer.

12. An ion fusion formation system, comprising:
    a plasma torch, the plasma torch emitting a plasma stream in a plasma path, the plasma stream creating a melt pool deposition point in a work surface, the plasma torch having an ionizing electrode ionizing adjacent gas, the adjacent gas being a first noble gas;
    a feedstock feeder, the feedstock feeder feeding feedstock into the plasma path of the plasma torch, and into the melt pool, the feedstock melting at the deposition point when introduced into the plasma path, the feedstock feeder having a feedstock sensing system that senses feedstock present at the deposition point;
    the plasma torch having a nozzle, the nozzle supplying the first noble gas to the ionizing electrode and a second noble gas to protect ionized atoms of the first noble gas so that the ionized atoms of the first noble gas more readily react or collide with the feedstock;
    a positioning system, the positioning system controlling the deposition point of the feedstock; and
    an information processing system including a computer coupled to the plasma torch, the feedstock feeder, and the positioning system, the information processing system transmitting control signals to the plasma torch, the feedstock feeder, and the positioning system and controlling operation of the plasma torch, the feedstock feeder, and the positioning system in a coordinated manner in order to fabricate the part by controlling operation at the deposition point; whereby
    a part or workpiece can be fabricated by transferring the feedstock from the feedstock feeder to the part in a continuous matter by melting it from the feedstock at the deposition point and allowing it to re-solidify on the part.

13. An ion fusion formation system as set forth in claim 12, wherein the feedstock feeder is selected from the group consisting of:
    wire feeders and powder feeders.

* * * * *